United States Patent [19]

Nishi et al.

[11] 4,322,593
[45] Mar. 30, 1982

[54] APPARATUS FOR PRE-HEATING RESIN TABLET

[75] Inventors: Kunihiko Nishi, Higashikurume; Yoshiaki Wakashima, Kawasaki; Akira Suzuki, Ome; Aizo Kaneda, Yokohama; Sumumu Tuzuku, Tokyo, all of Japan

[73] Assignee: Hitachi, Ltd., Tokyo, Japan

[21] Appl. No.: 97,126

[22] Filed: Nov. 26, 1979

[30] Foreign Application Priority Data

Nov. 24, 1978 [JP] Japan .................................. 53-144178

[51] Int. Cl.$^3$ .......................... H05B 6/56; H05B 6/50
[52] U.S. Cl. ................................ 219/10.81; 219/516; 219/518; 219/496; 425/174.8 R; 264/26; 264/DIG. 46
[58] Field of Search ............... 219/10.81, 10.53, 10.43, 219/10.41, 10.77, 10.75, 10.73, 507, 509, 510, 516, 518, 482, 490, 494, 496; 337/407, 408, 409; 156/273, 380; 324/424, 61 R; 425/174, 174.2, 174.4, 174.6, 174.8 R, 174.8 E; 264/25, 27, 234, DIG. 46

[56] References Cited

U.S. PATENT DOCUMENTS

| | | | |
|---|---|---|---|
| 750,150 | 1/1904 | Barten et al. | 337/407 |
| 2,020,364 | 11/1935 | Lehmann | 219/518 |
| 2,506,814 | 5/1950 | Sayre | 219/10.77 |
| 2,590,580 | 3/1952 | Schiavone | 219/10.77 |
| 3,283,126 | 11/1966 | Velvel | 219/512 X |
| 3,801,246 | 4/1974 | Gustavsson | 425/174.4 |

*Primary Examiner*—B. A. Reynolds
*Assistant Examiner*—Philip H. Leung
*Attorney, Agent, or Firm*—Craig and Antonelli

[57] ABSTRACT

An apparatus for pre-heating resin tablets comprising a resin tablet heater, a switch for setting a reference softening degree and a softening degree detector for the resin tablet. The detector includes a pressure source and a pressure transmitting member coupled to the pressure source and adapted for contact with the resin tablet. The pressure transmitting member is movable a distance representative of the softening degree of the resin tablet being heated due to deformation of the resin tablet.

12 Claims, 4 Drawing Figures

APPARATUS FOR PRE-HEATING RESIN TABLET

This invention relates to an apparatus for pre-heating resin tablets to be supplied to a resin molding apparatus as a molding material for producing molded products.

A transfer resin molding apparatus is commonly used for the manufacture of molded semiconductor devices such as resin-molded semiconductor devices, and a molding material for producing such semiconductor devices is supplied to the transfer resin molding apparatus for this purpose. It has been proposed in this connection to supply the molding material in the form of resin tablets of solid cylindrical shape and to pre-heat such resin tablets before being supplied to the resin molding apparatus.

The resin tablets are generally pre-heated for a predetermined length of time at a predetermined temperature by high-frequency heating, and then, the pre-heated resin tablets are placed in the pot of the resin molding apparatus.

However, such a simple manner of pre-heating the resin tablets gives rise to a defect as pointed out presently. Although the resin tablets are subjected to the pre-heating treatment for the predetermined length of time at the predetermined temperature, all of these resin tablets will not be uniformly softened to the same degree of softening due to a delicate difference between the softening points of the individual resin tablets. The resin tablets excessively softened will be excessively deformed, and air will be occluded and confined within the fused resin when a plurality of such resin tablets are placed in the pot and pressed by a ram. Consequently, voids will be formed in the mold thereby deteriorating the resistance of the molded products against moisture.

The results of researches and studies made by the inventors have clarified that such a difference between the softening points of the individual resin tablets is given rise to for the following reasons:

(1) The softening points of the individual resin tablets fluctuate over a relatively wide range due to the fact that the composition of the resin in one lot differs delicately from that in another lot and that the percentages of the constituents of the resin are not always the same even in the same lot.

(2) Before the resin tablets are pre-heated, they are left to stand in the atmosphere in an uncovered condition in many cases. The resin tablets left in such a condition absorb moisture present in ambient air, resulting in variations of the softening point. Thus, the individual resin tablets have different softening points due to the difference in the relative humidity of ambient air in various stations and also due to the difference in the length of time in which the resin tablets are left to stand in the atmosphere in the uncovered condition.

It is therefore a primary object of the present invention to provide a resin tablet pre-heating apparatus which can pre-heat resin tablets so that all the resin tablets can be softened to a predetermined degree of softening.

According to an aspect of the present invention, the resin tablet pre-heating apparatus comprises means for pre-heating a resin tablet, a lever continuously resiliently pressed against the resin tablet during pre-heating of the resin tablet, and detecting means automatically detecting the advancing stroke of the lever for stopping the pre-heating of the resin tablet when the lever has made a predetermined advancing stroke due to the gradual softening of the resin, that is, when the resin tablet has made a predetermined deformation, whereby a plurality of resin tablets all of which are uniformly softened to a predetermined degree of softening can be reliably supplied to a transfer resin molding apparatus.

The present invention will now be described by way of example with reference to the accompanying drawings, in which.

Figure 1:
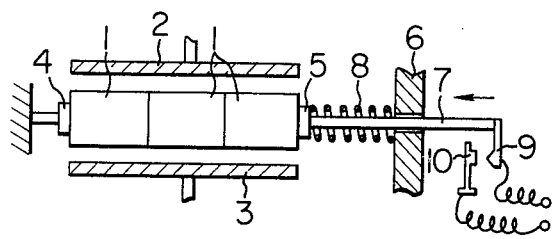
FIG. 1 is a schematic sectional view of a first embodiment of the resin tablet pre-heating apparatus according to the present invention.

Referring now to FIG. 1 showing a first embodiment of the apparatus according to the present invention, a predetermined number of, for example, three resin tablets 1 arranged in series are firmly held between a stationary abutment member 4 and a movable abutment member 5 in a pre-heating space defined between a pair of opposite electrodes 2 and 3 of a high-frequency heater. The movable abutment member 5 is fixed to one end of a lever 7 extending through and freely slidably supported by a stationary supporting member 6. A compression coil spring 8 functioning as a pressure source is mounted on the portion of the lever 7 between the movable abutment member 5 and the stationary supporting member 6 so as to impart a predetermined pressure through the movable abutment member 5 to the resin tablets 1 arranged in series and held between the stationary abutment member 4 and the movable abutment member 5.

A movable electrical contact 9 is mounted on the other end of the lever 7 transmitting the pressure generated by the spring 8 and extends toward the stationary abutment member 4. A fixed electrical contact 10 is disposed in the path of movement of the movable contact 9 toward the stationary abutment member 4. When the movable contact 9 is brought into contact with the fixed contact 10, current is supplied to a relay (not shown) to energize the relay thereby automatically deenergizing the high-frequency heating electrodes 2 and 3. Therefore, the contacts 9 and 10 constitute a switch for setting a reference softening degree. Further, although not shown, an alarm signal generator such as an alarm lamp or a buzzer may be provided to be energized upon deenergization of the high-frequency heating electrodes 2 and 3 so as to inform the operator of the fact that the pre-heating operation has been completed.

In the first embodiment of the present invention, a predetermined number of, for example, three resin tablets 1 to be pre-heated are mounted and held between the stationary abutment member 4 and the movable abutment member 5, and then, the high-frequency heating electrodes 2 and 3 are energized to apply heat to the resin tablets 1. As the resin tablets 1 are heated, the resin tablets 1 are gradually softened, and due to the pressure imparted by the compression coil spring 8, the resin tablets 1 are gradually deformed. Consequently, the lever 7, hence, the movable contact 9 mounted on the other end of the lever 7 starts to gradually move toward the fixed contact 10 along a substantially straight path. When the resin tablets 1 make a predetermined deformation, the movable contact 9 is brought into contact with the fixed contact 10, with the result that the high-frequency heating electrodes 2 and 3 heating the resin tablets 1 are automatically deenergized, and the alarm signal should be generated to inform the operator of the fact that the pre-heating operation has completed. Then, the operator removes the resin tablets 1 from the position held between the stationary abutment member 4 and the movable abutment member 5 and carries the resin tablets 1 to place them in the pot of the molding apparatus.

According to this embodiment, the lever 7 engaging at a predetermined pressure with the resin tablets 1 being heated or softened is arranged to make a predetermined advancing stroke until the fixed contact 10 is engaged by the movable contact 9, so that all the resin tablets 1 can reliably be uniformly softened to the predetermined degree of softening or pre-heating, and the undesirable fluctuation in the degree of softening can be reduced to a minimum. Thus, all of these resin tablets 1 can be suitably softened to such an extent that air may not be occluded and confined within the fused resin when the resin tablets are placed in the pot of the molding apparatus and pressed by the ram. It is apparent that such resin tablets can be simply and reliably obtained by suitably selecting the initial distance between the movable contact 9 and the fixed contact 10 constituting the switch in the open state. Therefore, molded products produced by molding with the resin tablets pre-heated by the resin tablet pre-heating apparatus embodying the present invention have substantially no voids in the interior as well as at the external surface of the molds and are sufficiently moisture-proof in addition to their beautiful appearance.

The present invention is in no way limited to the specific embodiment described above. In view of the fact that individual resin tablets tend to have different softening points, it is preferable to pre-heat the resin tablets one by one. However, when a plurality of resin tablets are placed in the pot of the molding apparatus at a time, such resin tablets may be pre-heated at the same time as in the aforementioned embodiment.

Figure 2:
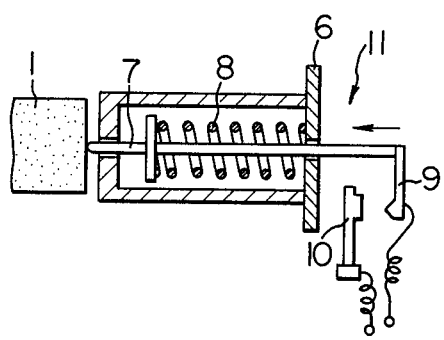
FIG. 2 is a schematic sectional view of part of a second embodiment of the present invention.
Figure 4:
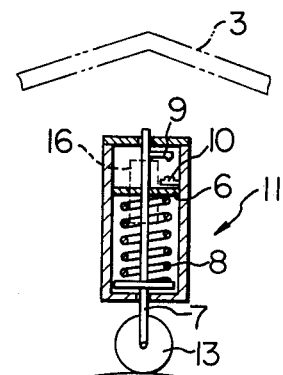
FIG. 4 is a schematic sectional view of part of a fourth embodiment of the present invention.
Figure 3:
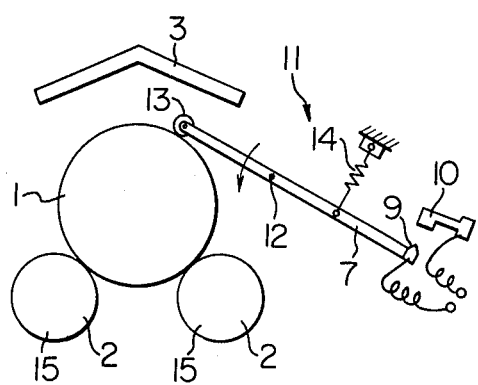
FIG. 3 is a schematic elevational view of a third embodiment of the present invention.

FIGS. 2, 3 and 4 show a second embodiment, a third embodiment and a fourth embodiment respectively of the present invention, and like reference numerals are used to designate like parts appearing in FIG. 1. The mechanism including means for detecting the degree of softening of resin tablets may have various structures as shown by 11 in FIGS. 2, 3 and 4.

The second embodiment shown in FIG. 2 differs from the first embodiment shown in FIG. 1 in that a lever 7 is not provided with a movable abutment member at one end thereof, and this end of the lever 7 has a reduced diameter or a reduced contact area so as to thrust into a resin tablet 1 with the gradual softening of the resin tablet 1.

In the third embodiment shown in FIG. 3, a lever 7 is rockably supported at its intermediary portion by a pivot 12, and a roller 13 is freely rotatably mounted on one end of the lever 7. This roller 13 is brought into pressure engagement with the peripheral surface of a resin tablet 1 by a spring 14. A movable electrical contact 9 is mounted on the other end of the lever 7, and a fixed electrical contact 10 is disposed in the path of movement of the movable contact 9. The resin tablet 1 is supported for rotation on a pair of roller electrodes 15 which act as the high-frequency heating electrode 2 shown in FIG. 1. Another high-frequency heating electrode 3 is disposed above the resin tablet 1 to heat the resin tablet 1 in cooperation with the roller electrodes 15. This third embodiment is advantageous in that the displacement of the roller 13 biting into the resin tablet 1 can be increased when the distance between the pivot 12 and the movable contact 9 is increased relative to the distance between the pivot 12 and the roller 13. In this third embodiment, the arrangement of various parts must be carefully designed and the material of the parts including the lever 7 and roller 13 must be carefully selected so that the roller 13 and the lever 7 may not make shorting engagement with the high-frequency heating electrode 3.

In the fourth embodiment shown in FIG. 4, a mechanism 11 including means for detecting the degree of softening of a resin tablet 1 is disposed between the resin tablet 1 supported on a high-frequency heating electrode (not shown) and an opposite high-frequency heating electrode 3. This mechanism 11 is supported by an arm 16 extending in a suitable direction, for example, in a direction parallel to the axis of the resin tablet 1. In this embodiment too, the considerations described with reference to the third embodiment are also required to prevent objectionable shorting.

In each of the aforementioned first to fourth embodiments, a spring-pressure adjusting means may be provided for adjusting or varying the pressure of the spring biasing the lever toward the resin tablet, and the spring may be mounted to be easily removed and replaced.

The heating means is in no way limited to the high-frequency heater, and any other suitable heating means well known in the art may be used in lieu thereof.

It will be understood from the foregoing description that all of the resin tablets which may have different softening points can be reliably and uniformly pre-heated to a predetermined degree of softening by the resin tablet pre-heating apparatus according to the present invention. Therefore, by suitably adjusting the softening detection mechanism so that all of the resin tablets can be pre-heated or pre-baked and softened to such an extent that air may not be occluded and confined within the fused resin when the resin tablets are placed in the pot of the molding apparatus and pressed by the ram, the molded products are free from voids like those which occurred hitherto, and molds of high quality can be produced with high reliability.

What we claim is:

1. An apparatus for pre-heating resin tablets comprising:

means for heating at least one resin tablet to soften the latter;

means for setting a reference softening degree for the at least one resin tablet; and means for detecting the softening degree of the at least one resin tablet, the detecting means including a pressure source and a pressure transmitting member coupled to the pressure source, said pressure transmitting member having one end for contact with a resin tablet to continuously exert pressure from the pressure source on the resin tablet to cause its yielding deformation when said tablet is softened by heating, the pressure transmitting member being arranged so as to be movable a distance in accordance with the yielding deformation to provide information representative of the softening degree being detected, and the detecting means being associated with the setting means to deenergize the heating means when the softening degree being detected becomes equal to the set reference softening degree, whereby resin tablets can be uniformly softened to said reference softening degree based on the yielding deformation of the tablets as the tablets are softened and notwithstanding any difference in softening points of the resin tablets.

2. An apparatus according to claim 1, in which the setting means includes an electrical switch having fixed and movable contacts, the initial distance between these contacts in their open state being adjustable and corresponding to the reference softening degree, the movable contact being connected with the other end of the pressure transmitting member, closure of the said contacts effecting deenergization of the heating means.

3. An apparatus according to claim 2, in which the pressure transmitting member includes a lever arranged so as to be movable in a substantially straight direction.

4. An apparatus according to claim 2, in which the pressure transmitting member includes a lever rockably supported at an intermediary portion of the lever itself.

5. An apparatus according to claim 3 or 4, in which the pressure source includes spring means for urging said lever into contact with the resin tablet.

6. An apparatus according to claim 5, in which an abutment member is provided at said one end of the lever.

7. An apparatus according to claim 5, in which the said one end of the lever has a sufficiently small contact area that it is adapted to thrust into the resin tablet when the at least one resin tablet is softened during heating.

8. An apparatus according to claim 5, in which said one end of the lever is provided with a roller for contact with the resin tablet.

9. An apparatus according to claim 1, further comprising means responsive to the deenergizing operation of the detecting means for indicating completion of the pre-heating of the resin tablet.

10. An apparatus according to claim 2, further comprising means for adjusting the pressure to be applied from the pressure source to the pressure transmitting member.

11. An apparatus according to claim 8, in which the heating means is a high-frequency heating means, and in which the high-frequency heating means includes a pair of roller electrodes arranged for frictional contact with the at least one resin tablet and acting as one pole of the high-frequency heating means.

12. An apparatus according to claim 6, in which said abutment member is adapted to have one surface thereof in contact with the resin tablet, and wherein the surface area of said one surface is sufficiently large such that said abutment member is not adapted to thrust into the resin tablet it is to be in contact with when said resin tablet is softened.

* * * * *

UNITED STATES PATENT AND TRADEMARK OFFICE
CERTIFICATE OF CORRECTION

PATENT NO.   :   4,322,593
DATED        :   March 30, 1982
INVENTOR(S)  :   Kunihiko NISHI, et al.

It is certified that error appears in the above—identified patent and that said Letters Patent is hereby corrected as shown below:

In the left-hand column on the first page, item [75]

Inventors, the last-named inventor,"Sumumu" should read

--Susumu--.

Signed and Sealed this

Fifth Day of June 1984

[SEAL]

Attest:

GERALD J. MOSSINGHOFF

Attesting Officer

Commissioner of Patents and Trademarks